Nov. 6, 1928.
L. E. BAKER
1,690,440
FISHING APPARATUS
Filed Feb. 7, 1927
3 Sheets-Sheet 1
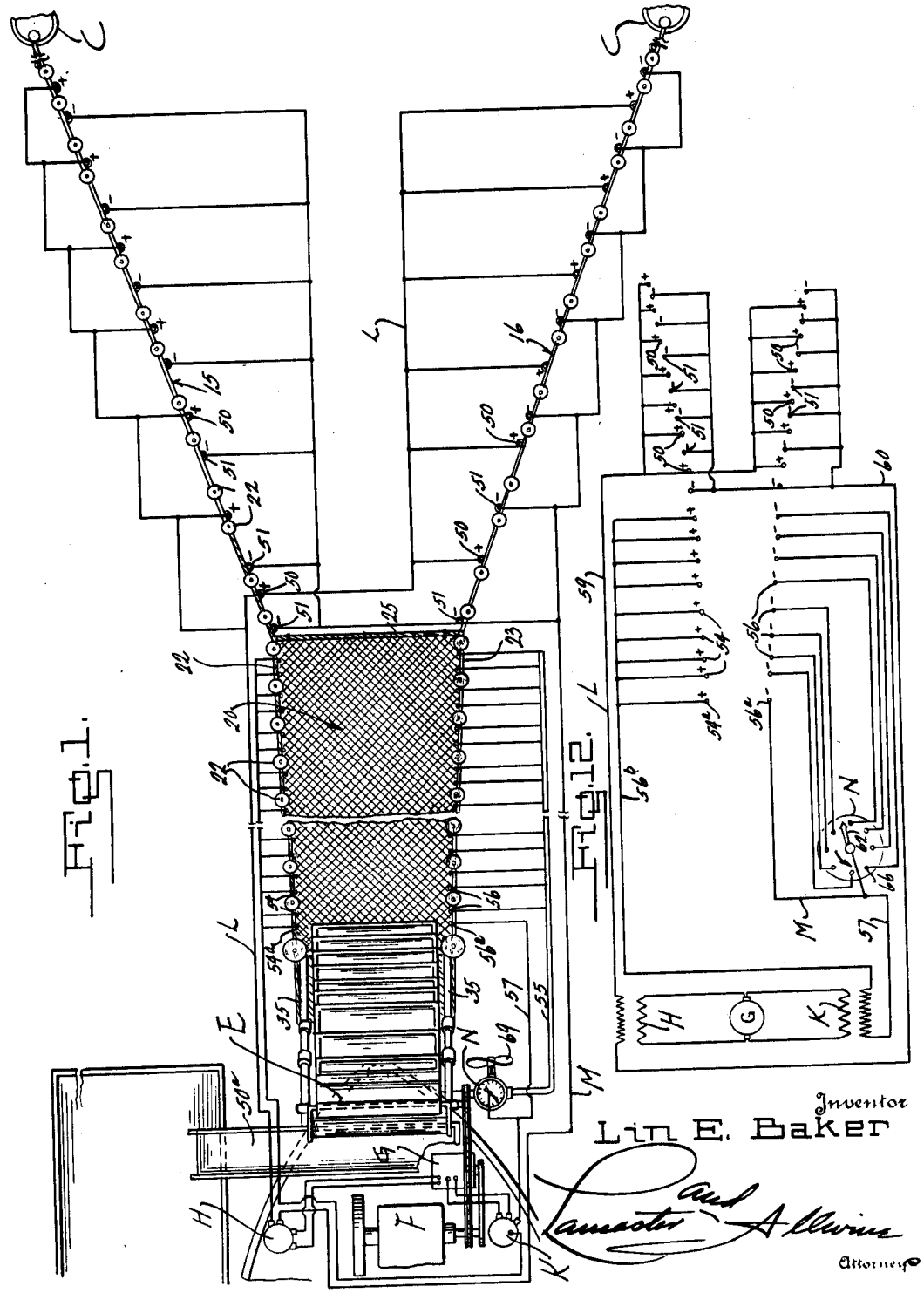
Inventor
Lin E. Baker

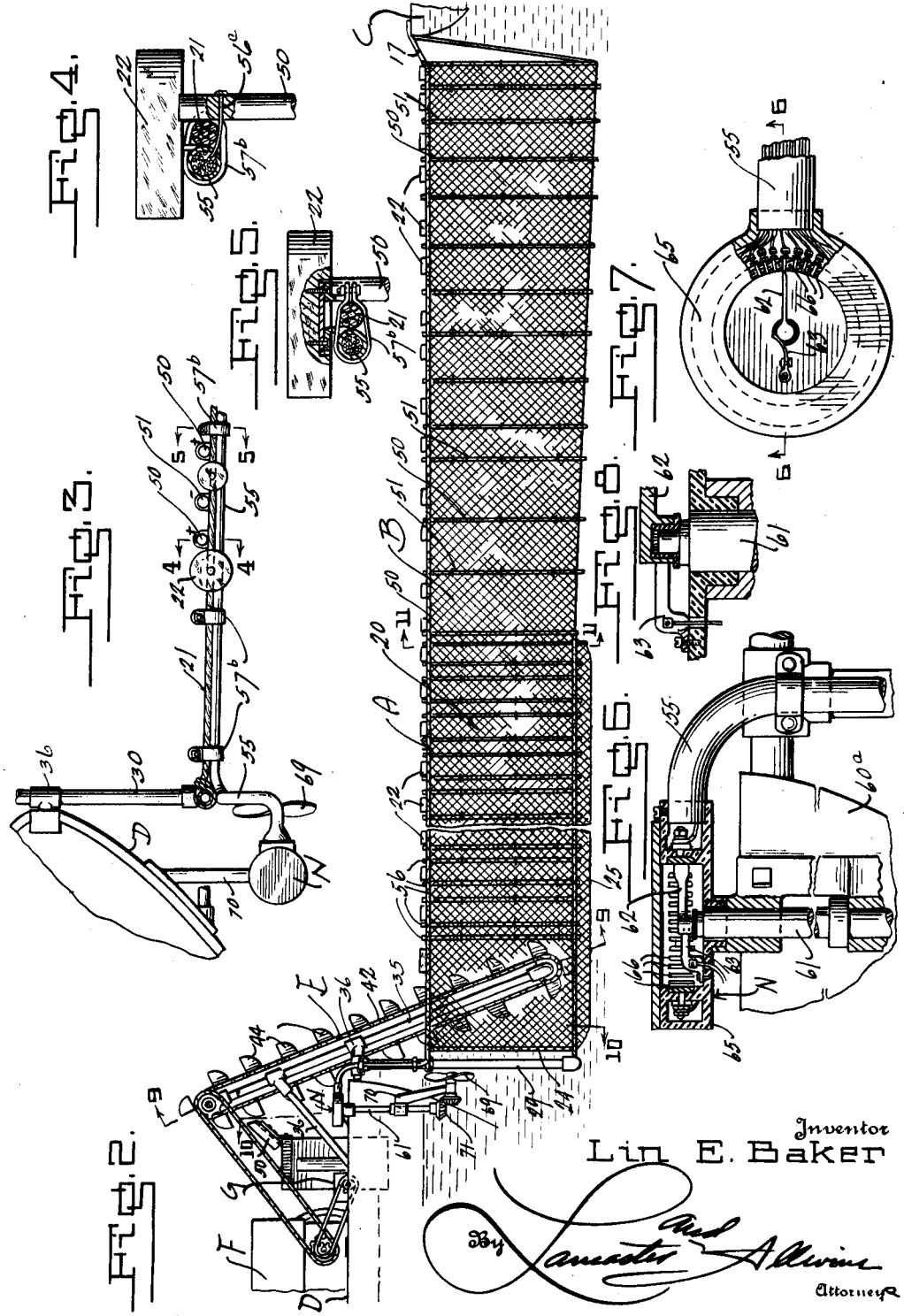

Nov. 6, 1928.
L. E. BAKER
FISHING APPARATUS
Filed Feb. 7, 1927
1,690,440
3 Sheets-Sheet 3
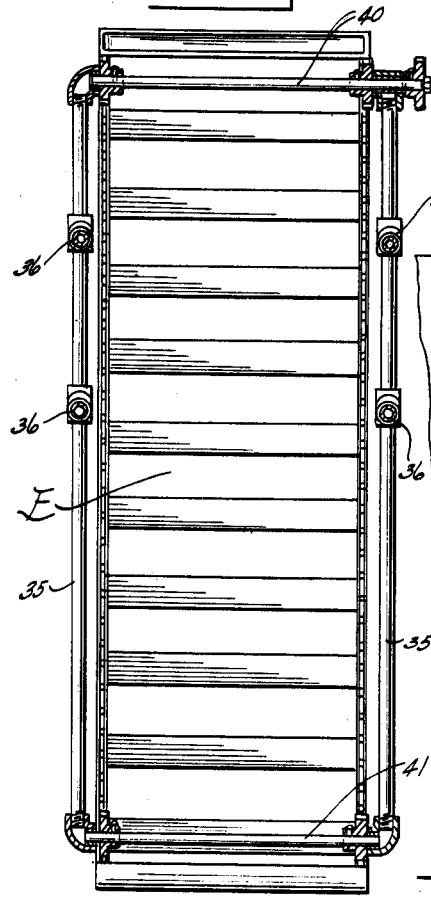
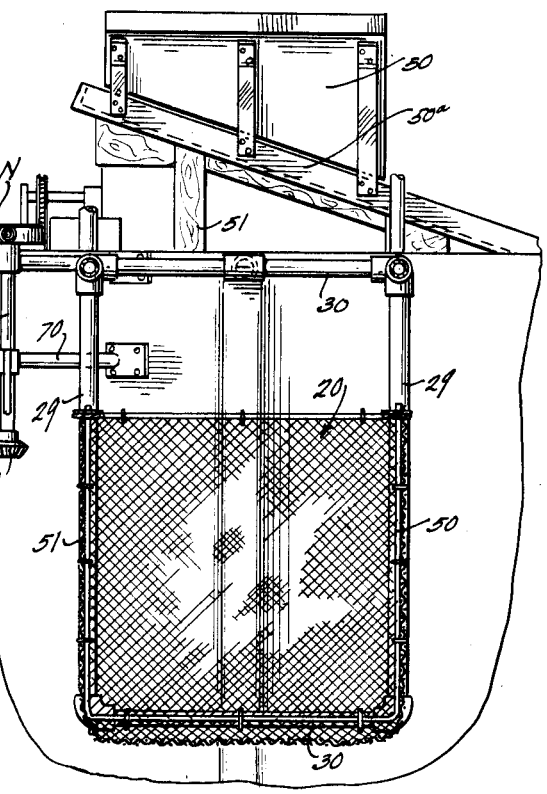
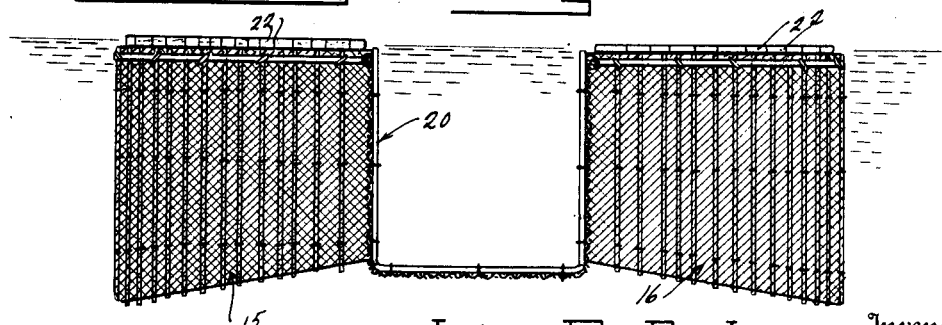
Lin E. Baker  Inventor Patented Nov. 6, 1928.

1,690,440

UNITED STATES PATENT OFFICE.

LIN E. BAKER, OF CHICAGO, ILLINOIS.

FISHING APPARATUS.

Application filed February 7, 1927. Serial No. 166,539.

This invention relates to improvements in fishing apparatus.

The primary object of this invention is the provision of improved fishing apparatus, adapted to be used in the commercial fishing industry, for the purpose of efficiently and expeditiously catching large quantities of fish.

A further object of this invention is the provision of fishing apparatus embodying means to catch and trap fish in a net trap, and therein subject them to electrical shocks in such manner as to cause them to proceed toward a conveyor which elevates them onto a loading barge or the like.

A further object of this invention is the provision of novel means for electrically trapping and stunning fish in nets, for the expeditious catching and handling thereof.

Other objects and advantages of this invention will be apparent during the course of the following detailed description.

In the accompanying drawings, forming part of this specification, and wherein similar reference characters designate corresponding parts throughout the several views, Figure 1 is a plan view, showing diagrammatically thereon the details necessary to complete a circuit for electrically shocking and trapping fish in trapping zones of the net.

Figure 2 is a side elevation of details of the improved net and incidental fish catching construction.

Figure 3 is a fragmentary detailed view showing the manner in which an improved net of the fishing apparatus may be connected to a trailing barge or float.

Figures 4 and 5 are views taken substantially on their respective lines in Figure 3 of the drawings.

Figure 6 is a fragmentary sectional view taken thru a current distributing device embodied in the fishing apparatus, this view being taken on the line 6—6 of Figure 7.

Figure 7 is a plan view, partly in section, of details of the distributor of Figure 6.

Figure 8 is an enlarged fragmentary sectional view of details of the rotary distributor.

Figure 9 is an enlarged sectional view taken substantially on the line 9—9 of Figure 2 of the drawings, showing a hopper or elevator for carrying the fish from the trapping net to the loading barge.

Figure 10 is a sectional view taken substantially on the line 10—10 of Figure 2.

Figure 11 is a sectional view taken substantially on the line 11—11 of Figure 2.

Figure 12 is a diagrammatic representation of the wiring circuit incidental to trapping and shocking of the fish in the fishing apparatus.

In the drawings, wherein for the purpose of illustration is shown only a preferred embodiment of the invention, the letter A may generally designate the improved fishing apparatus, which may comprise a net construction B, forwardly connected to a towing or propelling barge or barges C; and rearwardly connected by suitable framework to a trailing or follower barge or float D, whereon may be positioned suitable elevator mechanism E operated by a prime mover F, for the purpose of elevating fish from the net construction B to the barge or float D or adjacent thereto. A generator G is provided, suitably operated in any approved manner, for the purpose of generating current of desired character and voltage; the generator having in circuit therewith, transformers H and K, preferably the same being step-up transformers. In connection with the transformer H the circuit L is provided, in the entrance portion of the net, having suitable gaps between terminals thereof in the forward portion of the net, for properly guiding fish into the net; and in connection with the transformer K a circuit M is provided, having a current interrupting device N operably positioned therein; the circuit M including a plurality of gaps positioned in the rear portion of the net for cooperably trapping and stunning fish as they progress towards the elevator E.

Referring to the net construction B, the same includes wing portions 15 and 16 comprising the forward portions thereof, which extend for connection at their forward ends by suitable framework 17, to the float or floats C, as illustrated in Figures 1 and 2 of the drawings. These wings 15 and 16 converge from the float C rearwardly towards the rear or trap portion 20 of the net construction B. The wings 15 and 16 are of course of conventional reticulate construction, being formed of cords, fabric, or the like, having a top cord 21 running therealong, upon which floats 22 may be appropriately secured, as in conventional relation; the lower margins of the wings 15 and 16 being provided with weights, if desired, to support the same in vertical planes in the water during travel.

At the proximate rear ends of the wing portions 15 and 16, the trap 20 is positioned, the same being of substantially funnel-shape formation, and of any desired length, consistent with the nature of the fishing to be accomplished. The same may include side wall portions 22 and 23, in vertical position, and a rear wall 24, and also a bottom reticulate net portion 25, if desired. At the tops of the walls 22 and 23 suitable cables 21 such as above described may be provided, of any approved nature, having floats attached thereto as above described for the net wing portions 15 and 16. Suitable weights may be supported at the bottom of the net to hold the same in position, if desired.

The net construction B therefore consists of the lead-in wing portions 15 and 16 in converging relation from the forward open end of the net, which converge rearwardly toward the restricted compartment in the funnel-shaped net portion 20, as illustrated in the drawings, and it is in this compartment of the net portion 20 that the elevator E is operable to elevate the fish entrapped in the net portion 20.

The rear end of the net portion 20 may have the upper and lower supporting ropes thereof suitably connected to vertical framework 29 connected by cross bars 30 to the forward end of the barge or float D, in order to hold the rear end of the net portion in shape, as can readily be understood from the drawings.

The elevator E may be of any approved construction, preferably consisting of an elongated frame 35, secured as by brace arms 36 to the forward end of the barge or float D, so that the plane of the frame 35 is acutely inclined to the vertical. At the upper and lower ends the side rail portions of the frame 35 rotatably support shafts 40 and 41 respectively, over which a conveyor belt 42 is trained, having hoppers 44 thereon, with pockets opening upwardly at the forward side of the conveyor, for hauling the fish from the compartment of the rear net portion 20.

On the barge D or in any approved convenient location desired, a chute 50 may be mounted, as by suitable framework 51, onto which the fish are dumped by the elevator hoppers 44, and if desired an auxiliary chute 50ᵃ may be laterally inclined to deposit the fish into the compartment of the barge or float D.

The generator G is placed in any suitable location on the float or barge D, and the same may be of any approved construction, operated in any approved manner for the generation of current. Both the transformers H and K are mounted in circuit with the generator, for receiving current therefrom.

Referring to the circuit L wherein the transformer H is positioned, the same is provided with suitable electrodes in spaced relation on the wings 15 and 16 of the net construction B.

Alternating positive and negative electrodes 50 and 51 are arranged along the wing 15 of the net construction B; said electrodes being preferably vertical metallic rods suitably spliced or held in any approved manner in the mesh of the netting; said electrodes or rods 50 and 51 being vertically positioned.

As illustrated in Figure 4, the wires running to the various rods may be bunched together and housed in a suitable cable housing 55, and the respective leads therefrom may be connected as at 56ᶜ to the upper ends of the rods 50 and 51, as illustrated in Figure 4 of the drawings. This cable housing 55 may be connected by suitable clips 57ᵇ to the rope 21, to hold the same at the top of the net.

The positive and negative electrodes 50 and 51 are arranged in an alternating relation along the wing 15, and they are arranged in the same relation along the wing 16. One line 59 leading from the transformer H has all the positive electrodes 50 in circuit therewith, on both wings 15 and 16 of the net, as diagrammatically illustrated in Figure 12 of the drawings, and similarly the other line 60 leading off from the transformer H has the negative electrodes 51 of both wings 15 and 16 in circuit therewith.

It is readily observable that upon supplying of current to the circuit L, the circuit will pass through the water between the various electrodes 50 and 51 in each of the wings 15 and 16, substantially electrifying the said wings in vertical planes, so that the fish as they are guided into the net will be prevented from clogging the meshes of the wings of the net and will naturally swim towards the center between the wings 15 and 16, of their own volition. It is to be noted that the circuit L is not interrupted, and the flow of current between the electrodes 50 and 51 is continuous so long as the generator G is in operation, or so long as current is supplied to the transformer H.

Referring to the circuit M, the same is preferably provided with a plurality of positive electrodes 54, located in spaced relation along the wall 22 of the net portion or trap 20, and similarly the circuit M is provided with a plurality of negative electrodes 56 located along the opposite wall portion 23 of the net trap 20. The electrodes 55 and 56 are of identical construction with the electrodes 50 and 51 above described, the same preferably being metallic rods vertically disposed in the mesh of the net, and suitably connected in any approved terminal manner with the wires leading to the transformer. Preferably the transformer K has a wire 56ᵇ with lateral splice wires run to the various positive electrodes 54, and the transformer also has a wire 57 leading therefrom, in which the distributor N is connected intermediate the transformer K and the negative electrodes 56. The wire 57 shunts the distributor N and leads direct to preferably a single negative electrode 56ª, the same being the last one at the rear of the wall 23 of the net trap 20, adjacent the conveyor E, it being intended that the current will continuously pass across the last electrode 54ª of the wall 21, to a positive electrode 56ª during any operation of the generator, to provide a substantially continuously charged electric zone immediately forwardly of the conveyor E, where the fish may be finally shocked into insensibility to elevation by the conveyor E.

The purpose of the distributor N is to progressively move the electrically charged zones forwardly along the compartment of the trap 20, in order to cause the fish trapped therein to move towards the conveyor E. To this end the distributor N, as illustrated in Figures 6, 7 and 8 of the drawings includes a supporting casing 60ª having a rotatable shaft 61, on the upper end of which is provided a contact arm 62 having electrical connection by a terminal 63 with the wire 57, for feeding the current to the contact arm 62, which acts in the nature of a switch arm. The distributor casing head 65 is of insulation, and has embedded therein a plurality of contacts 66, which lead to the various negative electrodes 56 on the wall 23 of the net trap portion 20, so that only a single electrode 56 has a current passing therethrough at any one time, although this may be departed from, if it is found necessary to supply more than one of said negative electrodes with the current at the same time.

As to the operation of the distributor the arm 62 rotates in the direction illustrated in Figure 12 of the drawings, and successively engages the contacts 66, and the charged zones progressively move from the forward part of the compartment of the trap 20 towards the rear permanently charged zone by means of the current jumping between the electrodes 54ª and 56ª. Immediately after the last zone adjacent the permanently charged zone has been charged, the distributor N will then again shift the charged zone to the most forwardly positioned of the electrodes 54 and 56 to again progress towards the permanently charged zone across the electrodes 54ª and 56ª, and thus of course trapping the fish between the most forwardly charged zone represented by the electrodes 54 and 56 and the electrodes 54ª and 56ª, and as the charged zones move toward the permanently charged zone, the fish are of course maintained in a stunned condition for facile elevation on the conveyor E.

The progressively movable charged zones in the trap portion 20 of the fish net, as controlled by the distributor N, are progressed in their movement according to the movement of the net apparatus thru the water, or according to the relative flow of the stream thru the net, in case the net is to be stationary. In order that the electrically charged zones in the trap 20 will progress in accordance with the speed the net travels thru the water, or the speed of travel of the water thru the net, it is preferred that the disributor shaft 61 be driven by some suitable regulatory means, and thus an impeller 69, preferably a propeller is rotatably supported on the barge or float D, in bearing means 70, having suitable gear connection 71 with the shaft 61 for drive of the latter. It is readily apparent that as the net B is drawn through the water by the power floats C, the propeller 69 will be rotated for driving the shaft 61 in accordance with the speed of travel of the net.

It is of course understood that the charged zones are cross-wise of the compartment of the trap portion 20 of the net B, between the most proximately positioned positive and negative electrodes 54 and 56, and as the fish are guided into the trap portion 20 by the convergent electrically charged wing portions 15 and 16, the fish will enter the trap compartment during a progressive rearward movement of the electrical charged zone according to the rate of travel of the net through the water, or according to the rate of flow of the stream in which the net is positioned. After the last interrupted electric zone adjacent the permanently charged zone in which the electrodes 54ª and 56ª is operated, the distributor N will immediately throw the electrically charged zone between the most forwardly positioned of the electrodes 54 and 56, into operation, and trapping any fish in the compartment of the trap 20. The fish are in partially stunned condition, and due to the electrically charged zones in the trap compartment 20, will be maintained stunned until they reach the permanently charged zone of the transformer K, and at which time they will be so insensible that they may be readily raised without resistance by the elevator E onto the deck of the boat or float D.

From the foregoing description of this invention it is apparent that a novel means has been provided for efficiently trapping and expeditiously handling fish, with a compact apparatus. It may be well to mention that a serious drawback incident to fish elevators, as heretofore experienced, has been that the fish are disturbed by operation of the elevator, and swim away therefrom, but that due to the novel electrically charged zones, the fish will be rendered insensible or stunned, so that of their own volition they are unable to swim away from the elevator E and can be elevated thereby onto the boat D.

While with an alternating current, the electrodes will be alternately positive and negative, the drawing and specification designate the electrodes of the lead in wings in their opposed positive and negative relation, across the compartment, for the purpose of more readily understanding the operation.

Various changes in the shape, size, and arrangement of parts may be made to the form of invention herein shown and described, without departing from the spirit of the same or the scope of the claims.

I claim:

1. In fishing apparatus the combination of a fishing net having a compartment and an opening to the compartment thru which fish may enter, and means for intermittently passing an electric current across said compartment.

2. In fishing apparatus the combination of a fishing net having a compartment therein with an opening thereto, and means for progressively transferring an electrically charged zone transversely across the compartment from the opening of the compartment in a direction away therefrom.

3. In fishing apparatus the combination of a net having a compartment therein with an opening thereto, means in the compartment remote from the opening thereto for removing fish from the compartment, and means for transferring an electric current transversely thru the compartment for rendering the fish insensible that enter therein.

4. In fishing apparatus the combination of a fish net having a compartment with an opening thereto, means remote from the opening to the compartment comprising an elevator for removing fish from the compartment, and means arranged longitudinally of the compartment between the opening and said elevator for transversely passing current across said compartment for rendering the fish insensible that enter the compartment.

5. In fishing apparatus the combination of a fish net having a compartment with an opening thereto, means remote from the opening to the compartment comprising an elevator for removing fish from the compartment, means arranged longitudinally of the compartment between the opening and said elevator for transversely passing current across said compartment for rendering the fish insensible that enter the compartment, said means including means to progressively move the electrically charged zone from the opening slowly towards the elevator and thence in a quick return to the opening and again progressively slowly towards the elevator.

6. In fishing apparatus a net having a compartment with an opening thereto thru which fish may enter, means remote from said opening establishing a continuous electrical charged zone sufficient to render fish insensible, and means associated with the net, in the compartment between said electric zone and the opening to the compartment, for progressively establishing an electric zone transversely of the compartment from the opening to the compartment towards said continuous electric zone.

7. In fishing apparatus a net having a compartment with an opening thereto thru which fish may enter, means remote from said opening establishing a continuous electrical charged zone sufficient to render fish insensible, means associated with the net, in the compartment between said electric zone and the opening to the compartment, for progressively establishing an electric zone transversely of the compartment from the opening to the compartment towards said continuous electric zone, and means adjacent the continuous electric zone for mechanically removing fish from the compartment.

8. In fishing apparatus a net having a compartment with an opening thereto thru which fish may enter, means remote from said opening establishing a continuous electrical charged zone sufficient to render fish insensible, and means associated with the net, in the compartment between said electric zone and the opening to the compartment for progressively establishing an electric zone transversely of the compartment from the opening to the compartment towards said continuous electric zone, means adjacent the continuous electric zone for mechanically removing fish from the compartment, divergent lead-in wings of reticulate formation associated with said net in divergent relation away from said opening, and means for electrifying said divergent wings.

9. In fishing apparatus the combination of a trap net having a compartment therein and an opening thereto, means associated with the net for intermittently transversely passing an electric current thereacross, and means associated with the net operated by resistance offered to relative movement of the same with respect to the water in which the net may be submerged to progressively move the electric current along the compartment away from said opening.

10. In fishing apparatus a net defining a compartment having an opening thereto for receiving fish, means for transversely passing an electric current across said compartment in a plurality of zones arranged longitudinally of the compartment, means operated by relative resistance to the water for progressively operating the electric zones in a direction from the opening of the net away from said opening longitudinally of the compartment, and means establishing a permanently charged zone in the remote end of the compartment from said opening thereto.

11. In fishing apparatus a net defining a compartment having an opening thereto for receiving fish, means for transversely passing an electric current across said compartment in a plurality of zones arranged longitudinally of the compartment, means operated by relative resistance to the water for progressively operating the electric zones in a direction from the opening of the net away from said opening longitudinally of the compartment, means establishing a permanently charged zone in the remote end of the compartment from said opening thereto, and means adjacent the last mentioned permanently charged electric zone for mechanically removing fish from the compartment.

12. In fishing apparatus a net defining a compartment having an opening thereto for receiving fish, means for transversely passing an electric current across said compartment in a plurality of zones arranged longitudinally of the compartment, means operated by relative resistance to the water for progressively operating the electric zones in a direction from the opening of the net away from said opening longitudinally in the compartment, means establishing a permanently charged zone in the remote end of the compartment from said opening thereto, means adjacent the last mentioned permanently charged electric zone for mechanically removing fish from the compartment, divergent lead-in wings of reticulate net-like formation extending outwardly from the opening of said compartment, and means for creating an electrically charged zone along said wings.

13. In fishing apparatus a net including a trap-like net portion having an elongated compartment with an opening thereto, divergent lead-in net wings extending from the opening of the compartment away therefrom, means connected with said wings at the forward ends thereof for pulling the net, means associated with the rear end of said net including a float, elevator means for elevating fish from the compartment to said float, and means for transversely passing an electric current thru said compartment sufficient to stun the fish received therein.

14. In fishing apparatus a net including a trap-like funnel portion having an elongated compartment with an opening thereto, divergent lead-in net wings extending from the opening of the compartment away therefrom, means connected with said wings at the forward ends thereof for pulling the net, means associated with the rear end of said net including a float, elevator means for elevating fish from the compartment to said float, means for transversely passing an electric current thru said compartment, and means for progressively moving electric zones from the opening of the compartment towards said elevator.

15. In fishing apparatus a net having a compartment longitudinally therealong with an opening thereto, a plurality of positive electrodes arranged along the compartment, a plurality of negative electrodes arranged along the compartment spaced from the positive electrodes, a circuit for said electrodes, means for passing an electric current thru said circuit, and distributor means including a stream flow operated propeller for progressively passing the current into predetermined positive and negative electrodes to produce electrically charged zones shiftable along the compartment away from said opening.

LIN E. BAKER.